(12) United States Patent
Vatne

(10) Patent No.: US 11,993,351 B2
(45) Date of Patent: May 28, 2024

(54) SINGLE-COLUMN SEMI-SUBMERSIBLE PLATFORM

(71) Applicant: Stationmar AS, Evje (NO)

(72) Inventor: Per Andreas Vatne, Kristiansand (NO)

(73) Assignee: STATIONMAR AS, Kristiansand (NO)

( * ) Notice: Subject to any disclaimer, the term of this patent is extended or adjusted under 35 U.S.C. 154(b) by 333 days.

(21) Appl. No.: 17/601,916

(22) PCT Filed: Apr. 7, 2020

(86) PCT No.: PCT/NO2020/050097
§ 371 (c)(1),
(2) Date: Oct. 6, 2021

(87) PCT Pub. No.: WO2020/209728
PCT Pub. Date: Oct. 15, 2020

(65) Prior Publication Data
US 2022/0144390 A1   May 12, 2022

(30) Foreign Application Priority Data

Apr. 8, 2019   (NO) .................................. 20190481

(51) Int. Cl.
*B63B 39/02* (2006.01)
*B63B 21/26* (2006.01)
(Continued)

(52) U.S. Cl.
CPC .............. *B63B 39/02* (2013.01); *B63B 21/26* (2013.01); *B63B 21/30* (2013.01); *B63B 35/44* (2013.01); *B63B 2035/446* (2013.01)

(58) Field of Classification Search
CPC ......... B63B 39/02; B63B 21/26; B63B 21/30; B63B 35/44
See application file for complete search history.

(56) References Cited

U.S. PATENT DOCUMENTS

| | | | | |
|---|---|---|---|---|
| 7,878,734 | B2 * | 2/2011 | Bull | B63B 39/06 60/497 |
| 10,578,075 | B2 * | 3/2020 | Sheldon-Coulson | F03D 3/002 |
| 2007/0046027 | A1 * | 3/2007 | Stewart | F03B 13/1815 290/43 |

FOREIGN PATENT DOCUMENTS

| | | |
|---|---|---|
| GB | 2538329 A | 11/2016 |
| WO | 1997/006340 A1 | 2/1997 |
| WO | 2018/058975 A1 | 4/2018 |

OTHER PUBLICATIONS

PCT/NO2020/050097; International Search Report and Written Opinion; dated Jul. 21, 2020; 13 pages.

* cited by examiner

Primary Examiner — S. Joseph Morano
Assistant Examiner — Jovon E Hayes
(74) Attorney, Agent, or Firm — Kilpatrick Townsend & Stockton LLP

(57) ABSTRACT

A single-column semi-submersible platform for fixed anchoring in deep water. The semi-submersible platform comprises a lower solid ballast module, a middle seawater ballast module and a top buoyancy module. The three modules are arranged telescopically in an axial direction and can be controlled relative to each other in the axial direction such that the semi-submersible platform may float vertically and steadily in a body of water. Draught for the seawater ballast module and buoyancy module is provided by seawater ballasting. The axial position of the solid ballast module relative to the seawater ballast module is controlled by seawater being pumped in and out of a closed annulus formed between the solid ballast module and the seawater ballast module.

20 Claims, 8 Drawing Sheets

(51) Int. Cl.
*B63B 21/30* (2006.01)
*B63B 35/44* (2006.01)

SINGLE-COLUMN SEMI-SUBMERSIBLE PLATFORM

The present invention describes a single-column semi-submersible platform of the spar platform type. The platform comprises three modules, which are axially moveable relative to one another.

BACKGROUND

Wind turbines and other installations are frequently installed at sea, and there is a need for a stable, floating platform that can be used in deep waters. A semi-submersible platform may provide a foundation e.g. for wind turbine-driven electric generators that are installed at great water depths, where installing land-based platforms traditionally would not be profitable.

There is therefore a need for an improved semi-submersible platform to reduce or eliminate known disadvantages of known techniques. There is also need for a semi-submersible platform that may save costly maritime operations as well as radically reduce movements of the platform for minimum environmental impact. It is an objective of the present invention to achieve this and to provide further advantages over the state of the art.

Documents useful for understanding the field of technology include RU 2221917 C2 and WO 2018/058975 A1.

SUMMARY

It is an object of the present invention to mitigate, alleviate or eliminate one or more of the above-identified deficiencies and disadvantages in the prior art and solve at least the above mentioned problem.

According to a first aspect, there is provided a single-column semi-submersible platform for fixed anchoring in deep water, the semi-submersible platform comprising:
  a lower solid ballast module;
  a middle seawater ballast module;
  a top buoyancy module;
  the three modules are arranged telescopically in an axial direction and can be controlled relative to each other in the axial direction such that the semi-submersible platform may float vertically and steadily in a body of water;
  draught for the seawater ballast module and buoyancy module is provided by seawater ballasting;
  the axial position of the solid ballast module relative to the seawater ballast module is controlled by seawater being pumped in and out of a closed annulus formed between the solid ballast module and the seawater ballast module.

According to an embodiment of the invention the solid ballast module comprises an upper cylindrical portion that has a diameter that is greater than a lower cylindrical portion.

According to an embodiment of the invention the seawater ballast module is a hollow cylinder with inner cylindrical portions of various diameters.

According to an embodiment of the invention the buoyancy module comprises a lower cylindrical portion and an upper cylindrical portion.

According to an embodiment of the invention the seawater ballast module is hollow for accommodating the solid ballast module and the buoyancy module.

According to an embodiment of the invention the solid ballast module, seawater ballast module and buoyancy module each comprises a through-going axial cavity.

According to an embodiment of the invention the buoyancy module comprises an integrated heave-neutralizing system with a confined air pressure volume, which balances the level in a rise canister under the lowest water level of the sea for waves and tide for the current location.

According to an embodiment of the invention the integrated heave-neutralizing system allows rigid anchoring without vertical heave movements and thereby allows a secondary rigid anchoring with flat angle at a lower level on the platform, so that the vertical banking angle is reduced, and the semi-submersible platform is exposed to minimum environmental impact.

According to an embodiment of the invention the top buoyancy module comprises a foundation for connection to a tower for wind generators.

According to an embodiment of the invention the semi-submersible platform is anchored to a seabed by means of anchoring lines.

The present invention will become apparent from the detailed description given below. The detailed description and specific examples disclose preferred embodiments of the invention by way of illustration only. Those skilled in the art understand from guidance in the detailed description that changes and modifications may be made within the scope of the invention.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an" and "the" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present invention, will be more fully appreciated by reference to the following illustrative and non-limiting detailed description of example embodiments of the present invention, when taken in conjunction with the accompanying figures.

DETAILED DESCRIPTION

The present invention will now be described with reference to the accompanying drawings, in which preferred example embodiments of the invention are shown. The invention may, however, be embodied in other forms and should not be construed as limited to the herein disclosed embodiments. The disclosed embodiments are provided to fully convey the scope of the invention to the skilled person.

Figure 1:
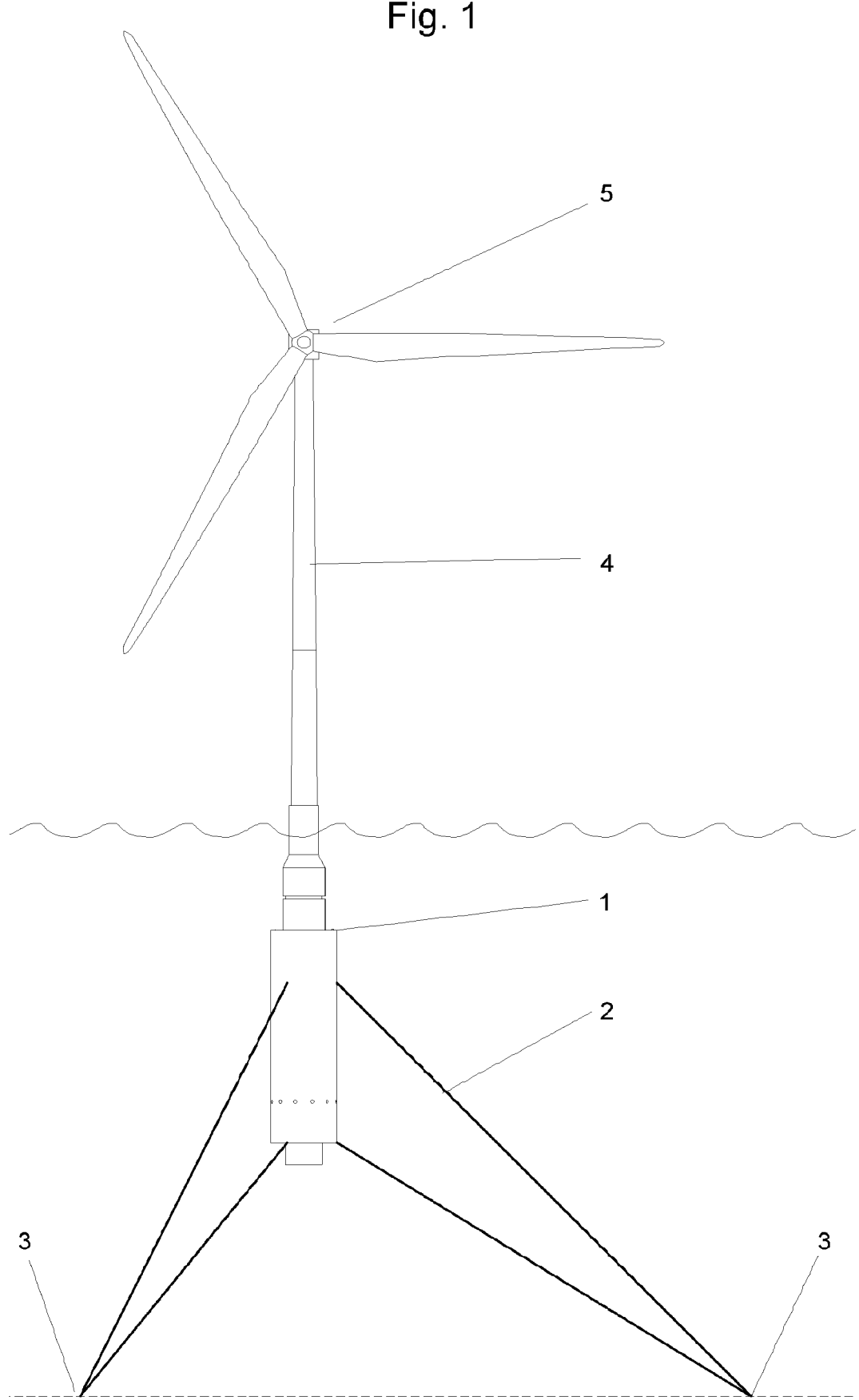
FIG. 1 shows a side view of a floating platform anchored to the bottom of a sea.

FIG. 1 shows a single-column semi-submersible platform 1 installed at sea at a water depth in the magnitude of 150 metres. The semi-submersible platform 1 is anchored by means of anchoring lines 2 attached to anchor attachments 3 on the seabed. There may preferably be three or more pairs of anchoring lines 2, for fixing the semi-submersible platform 1 in a horizontal direction. The anchor attachments 3 can be suction anchors or different types. A tower 4 is connected to the top of the semi-submersible platform 1, carrying a wind power generator 5.

Figure 2:
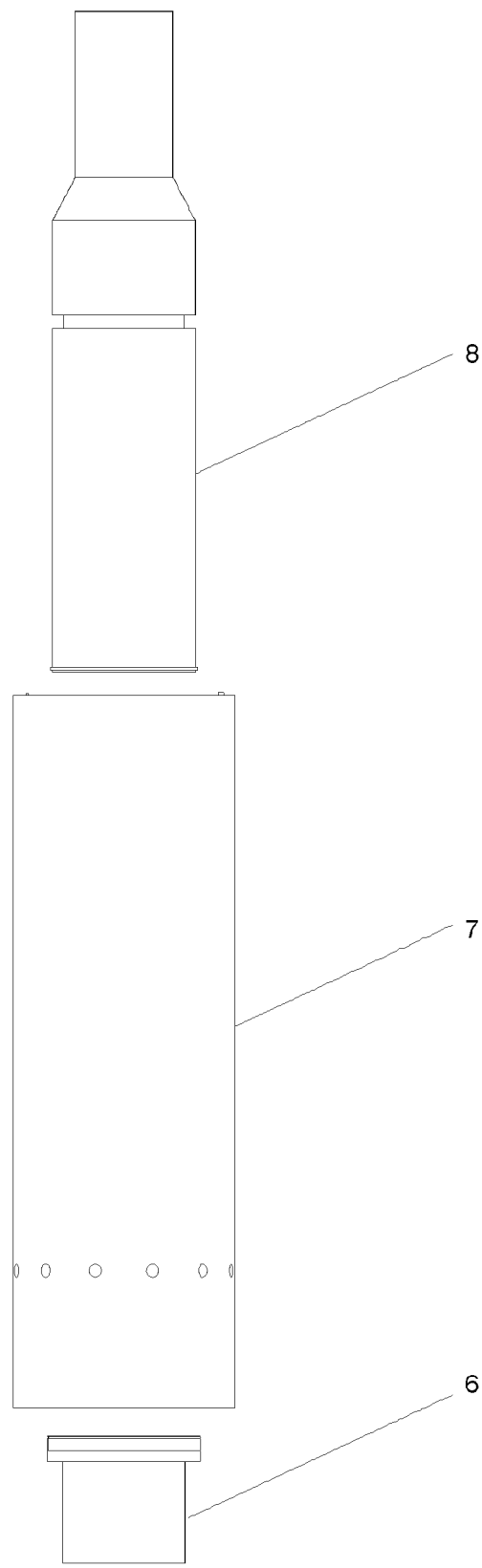
FIG. 2 shows an exploded side view of a solid ballast module, seawater ballast module and buoyancy module of the floating platform.

FIG. 2 shows the semi-submersible platform 1 in an exploded view. The semi-submersible platform 1 comprises a lower solid mass ballast module 6, a middle seawater ballast module 7, and a top buoyancy module 8. The three modules are arranged axially, and are illustrated separated in FIG. 2 for illustration purposes.

Figure 3:
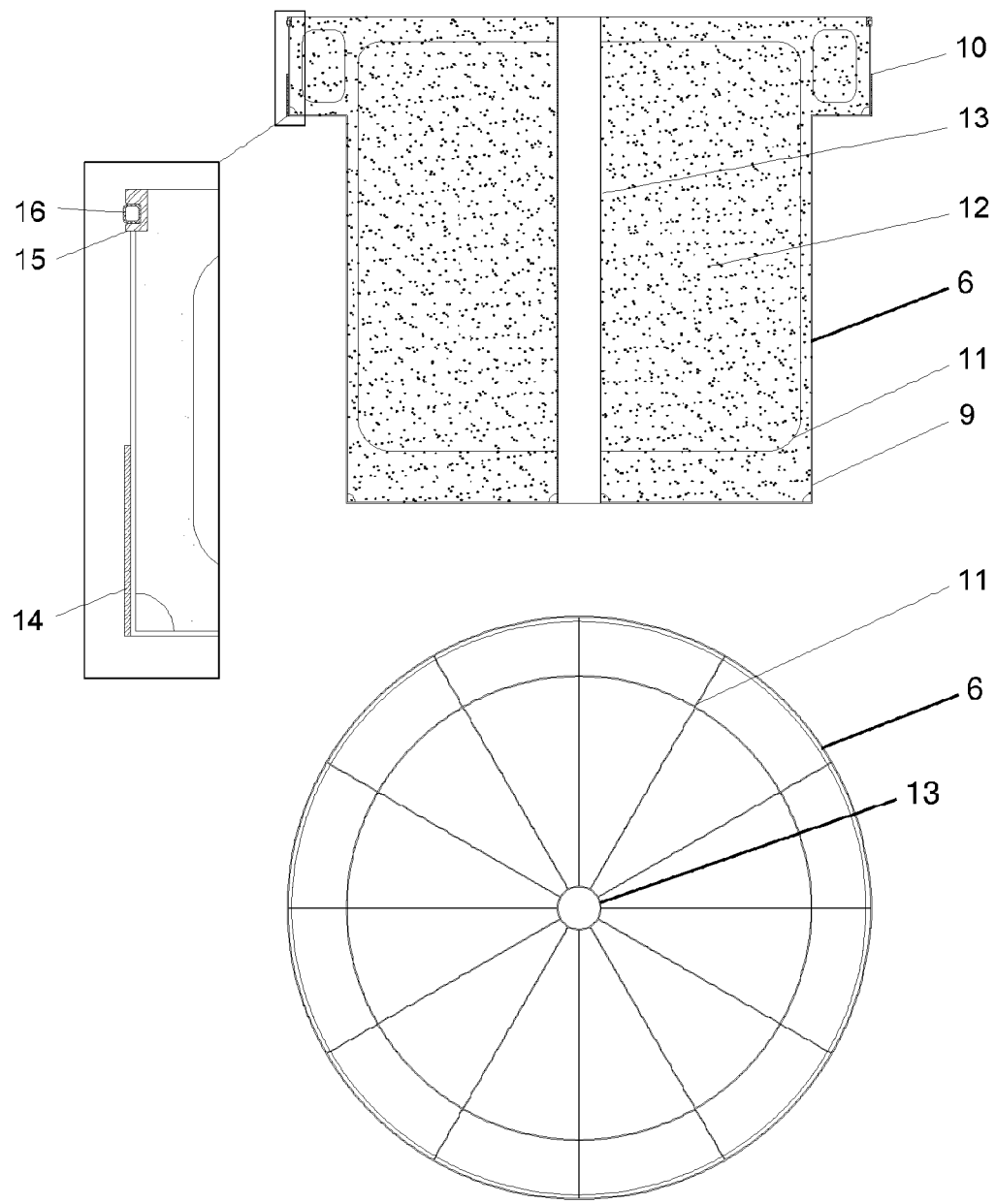
FIG. 3 shows a vertical and horizontal cross section of a solid ballast module.

FIG. 3 shows the solid mass ballast module 6. The module 6 is shown in a centric vertical cross section and a horizontal plane. The solid mass ballast module 6 may have an outer shape of a stepped cylinder—preferably built of steel—with a lower portion 9 and an upper portion 10. The upper portion 10 has an outer diameter that is greater than the outer diameter of the lower portion 9, such that the upper portion 10 forms a flange or protruding portion of the solid mass ballast module 6.

The solid mass ballast module 6 may further comprise inner strut bulkheads 11, that are terminated against a centre tube 13. The centre tube 13 is a through-going axial cavity. A cavity 12 of the solid mass ballast module 6 is filled with high-density mass, preferably iron ore. A radial storage arrangement 14 arranged on the upper portion 10 can be of steel or another material, and a ring 15 with dents may also be provided on the upper portion 10. The upper portion 10 may also be provided with an inflatable gasket 16, for sealing tight with the seawater ballast module 7.

Figure 4:
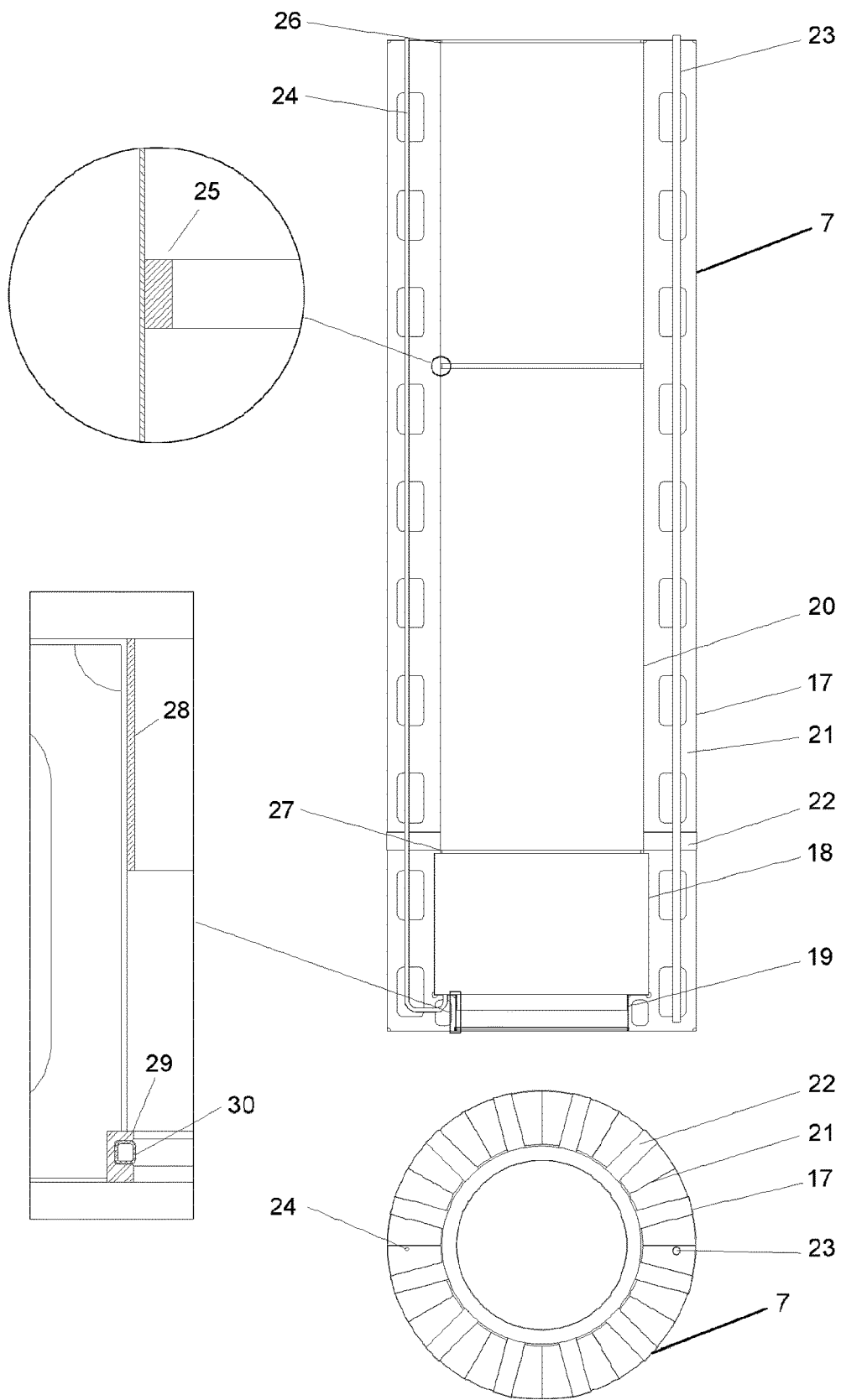
FIG. 4 shows a vertical and horizontal cross section of a seawater ballast module.

FIG. 4 shows the seawater ballast module 7 in centric vertical cross section and a horizontal cross section. The seawater ballast module 7 comprises a hollow cylinder with various inner diameters. A lower portion 19 has an inner diameter corresponding to or being adapted to contact the outer diameter of the lower portion 9 of the solid mass ballast module 6 (of FIG. 3). A middle portion 18 has an inner diameter corresponding to or being adapted to contact the outer diameter of the upper portion 10 (i.e. the gasket 16) of the solid mass ballast module 6 (of FIG. 3). An upper portion 20 has an inner diameter that allows the buoyancy module 8 to be telescoped within.

A row of strut bulkheads 21 is arranged between outer and inner cylinder walls of the seawater ballast module 7. A row of tubes 22 may ensure seawater flow between the outer wall 17 and the inner wall. A tube 23 may be provided to control the level of ballast water. The necessary valve and pump arrangement is not shown. A tube 24 may be provided for pumping in pressurized seawater or drain the annulus 46 formed between the middle portion 18 and the lower portion 9 of the solid mass ballast module 6 (see FIG. 6).

In order to raise the solid mass module 6 (shown in FIG. 3), water is pumped into this annulus—this is explained with reference to FIG. 6. An upper flange shoulder 25 is the upper telescope limitation for the buoyancy module 8, and a similar lower flange shoulder 27 is the lower telescope limitation. A similar type of flange shoulder 26 at the top of the seawater ballast module 6 is a radial bearing against the buoyancy module 8. A radial support 28 is provided on the lower portion 19 for contacting the solid mass ballast module 6, and a ring with gasket 29 with dents may be provided together with an inflatable gasket 30 for sealing with the lower portion 9 of the solid mass ballast module 6. The inside of the upper portion 20, middle portion 18 and lower portion 19 define a through-going axial cavity of the seawater ballast module 7.

Figure 5:
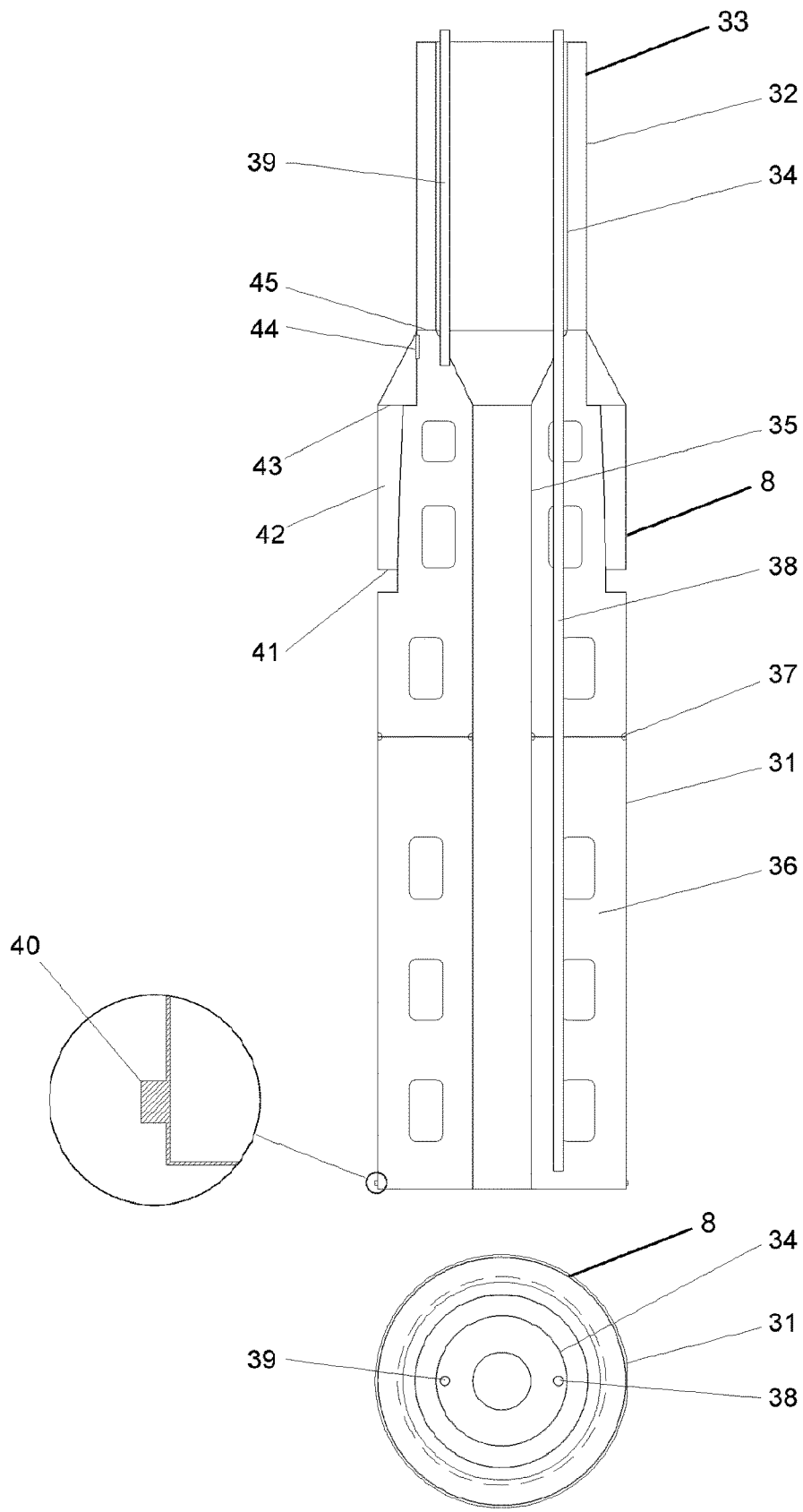
FIG. 5 shows a vertical and horizontal cross section of a buoyancy module.

FIG. 5 shows the buoyancy module 8 in centric vertical cross section and top plane. The buoyancy module 8 is a hollow structure, and may be formed by a lower cylindrical portion 31 and an upper cylindrical portion 32. The outer cylindrical portions may be connected by a cone-shaped surface. In the illustrated embodiment, the upper cylindrical portion 32 has a smaller diameter than the lower cylindrical portion 31. The upper cylindrical portion 32 may comprise a foundation 33 for connection to a tower 4 for a wind generator 5, as illustrated in FIG. 1.

The upper cylindrical portion 32 may comprise an inner cylindrical surface 34, and the lower cylindrical portion 31 may comprise an inner cylindrical surface 35. Strut bulkheads 36 may be arranged between the outer and the inner walls. A lower bulkhead 37 separates ballast seawater in the volume below and air pressure in the volume above of the buoyancy module 8. The inner cylindrical surface 34 and inner cylindrical surface 35 define a through-going axial cavity of the buoyancy module 8.

A tube 38 may control the level of ballast water in the buoyancy module 8. A tube 39 may control the air pressure in the volume above the lower bulkhead 37. A shoulder flange 40 is configured for abutting the shoulder flanges 25 and 27 of the seawater ballast module 7 in FIG. 4, and thus limits the axial telescoping movement of the buoyancy module 8 inside the seawater ballast module 7.

An opening 41 may be provided for emptying seawater out of the annulus-shaped rise canister 42. In operating draught, the level of the rise canister 42 must be between the bottom 41 and the top 43 of the rise canister 42, balanced by the air pressure and depending on the wave height of the sea on the outside of the outer wall 32. An opening 44 allows air to flow to and from the rise canister 42 to the volume between an upper bulkhead 45 and the lower bulkhead 37.

Figure 6:
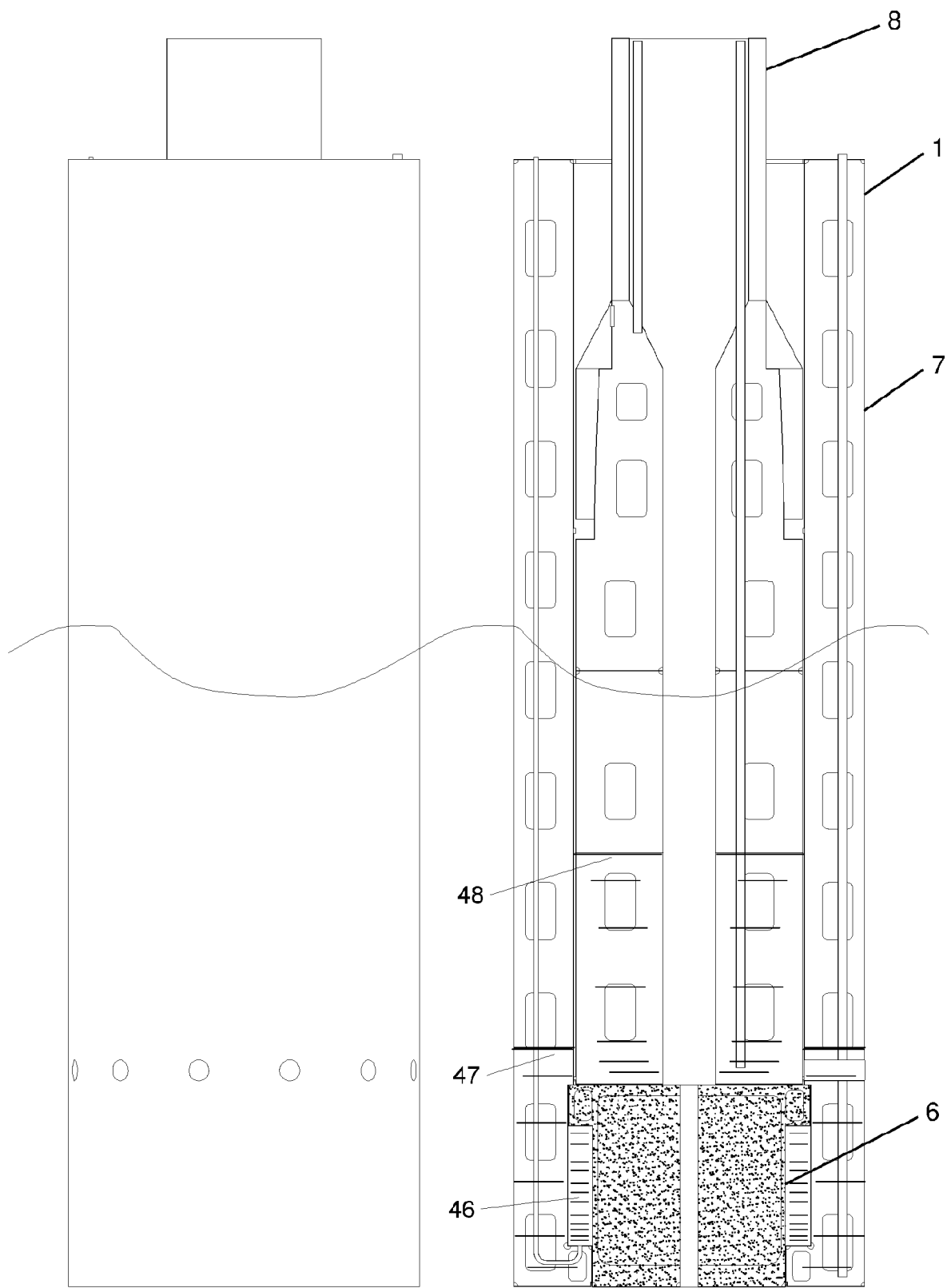
FIG. 6 shows a side view and vertical cross section of the solid ballast module, seawater ballast module and buoyancy module telescoped together.

FIG. 6 shows the solid mass ballast module 6, the seawater ballast module 7 and the buoyancy module 8 telescoped together to form the semi-submersible platform 1, steadily floating in a body of water. The annulus 46 formed between the solid mass ballast module 6 and the seawater ballast module 7 has a confined water volume, wherein the pressure keeps the solid mass ballast module 6 buoyed relative to the seawater ballast module 7. The annulus 46 may thus be formed between at least a portion of the underside of the upper portion 10 of the solid mass ballast module 6, at least a portion of the lower portion 9 of the solid mass ballast module 6, at least a portion of an upper side of the lower portion 19 of the seawater ballast module 7 and at least a portion of the middle portion 18 of the seawater ballast module 7.

The seawater ballast module 7 has in FIG. 6 a balanced ballast water level 47 to float steadily and the buoyancy module 8 is ballasted down with ballast water 48, so that the shoulder flange 40 of the buoyancy module 8 rests against the shoulder flange 27 of the seawater ballast module 7 (shown in FIGS. 4 and 5).

Figure 7:
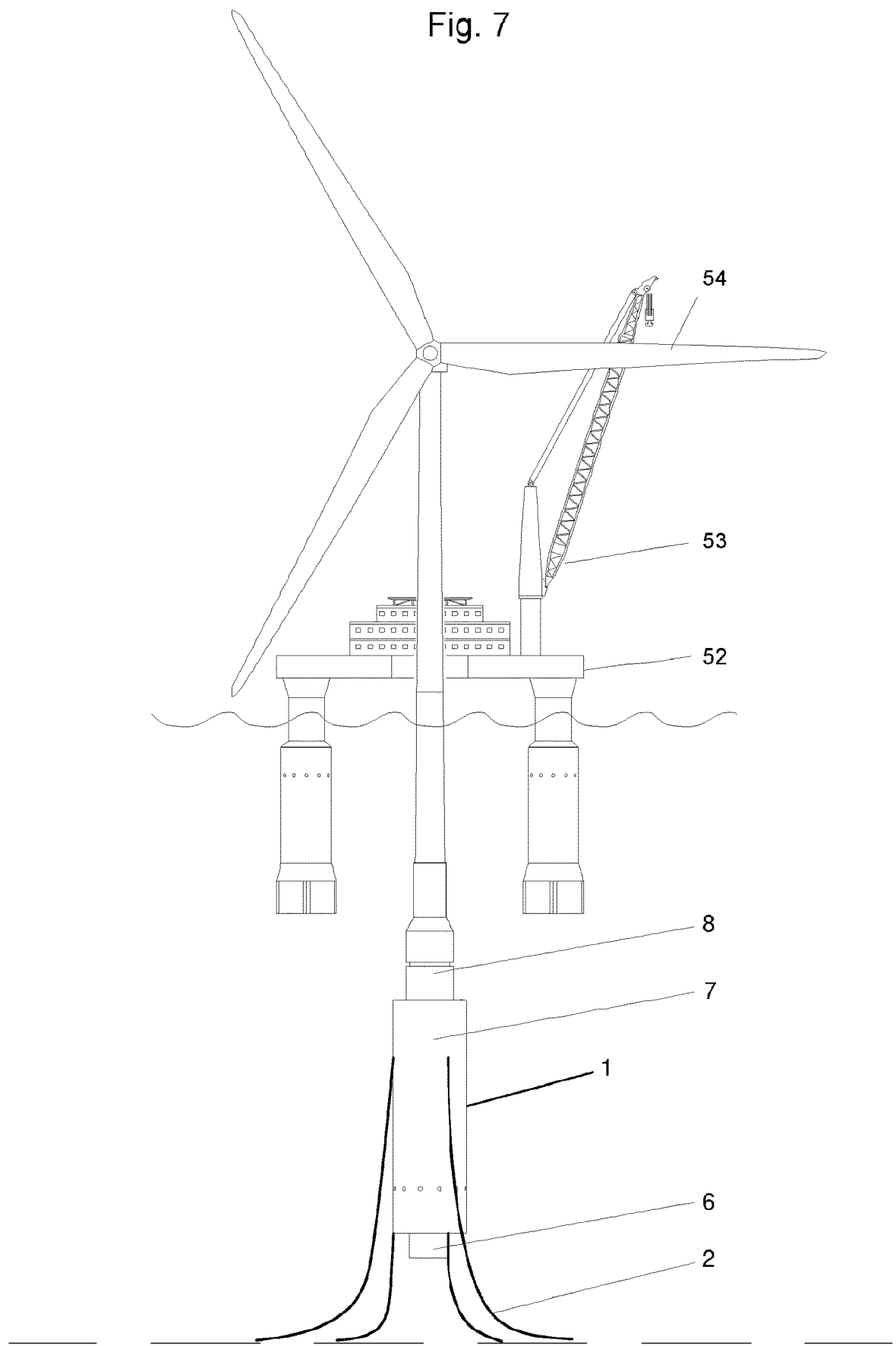
FIG. 7 shows a side view of the solid ballast module submersed relative to the seawater ballast module with slack anchoring lines.

FIG. 7 shows the solid mass module 6 submersed relative to the seawater ballast module 7, this is provided by draining the annulus volume 46 (not shown) through the tube 24 (not shown), as described with reference to FIGS. 4 and 6, and the buoyancy module 8 being telescoped up relative to the seawater ballast module 7.

Telescoping the buoyancy module 8 up is provided by pumping out the ballast water 48 (from FIG. 6) from the buoyancy module 8. The semi-submersible platform 1 is now ballasted down to a sufficiently low level for a floating rig 52 with a crane 53 to be able to mount e.g. a wind generator's turbine blades 54. At the same time, the in advance accurately calculated and measured mooring lines 2, which are preferably synthetic fibre rope of light material, may be attached to anchoring arrangements on the platform. Arranging such anchoring attachments are known in the art and can be done by ROV and support vessels.

Figure 8:
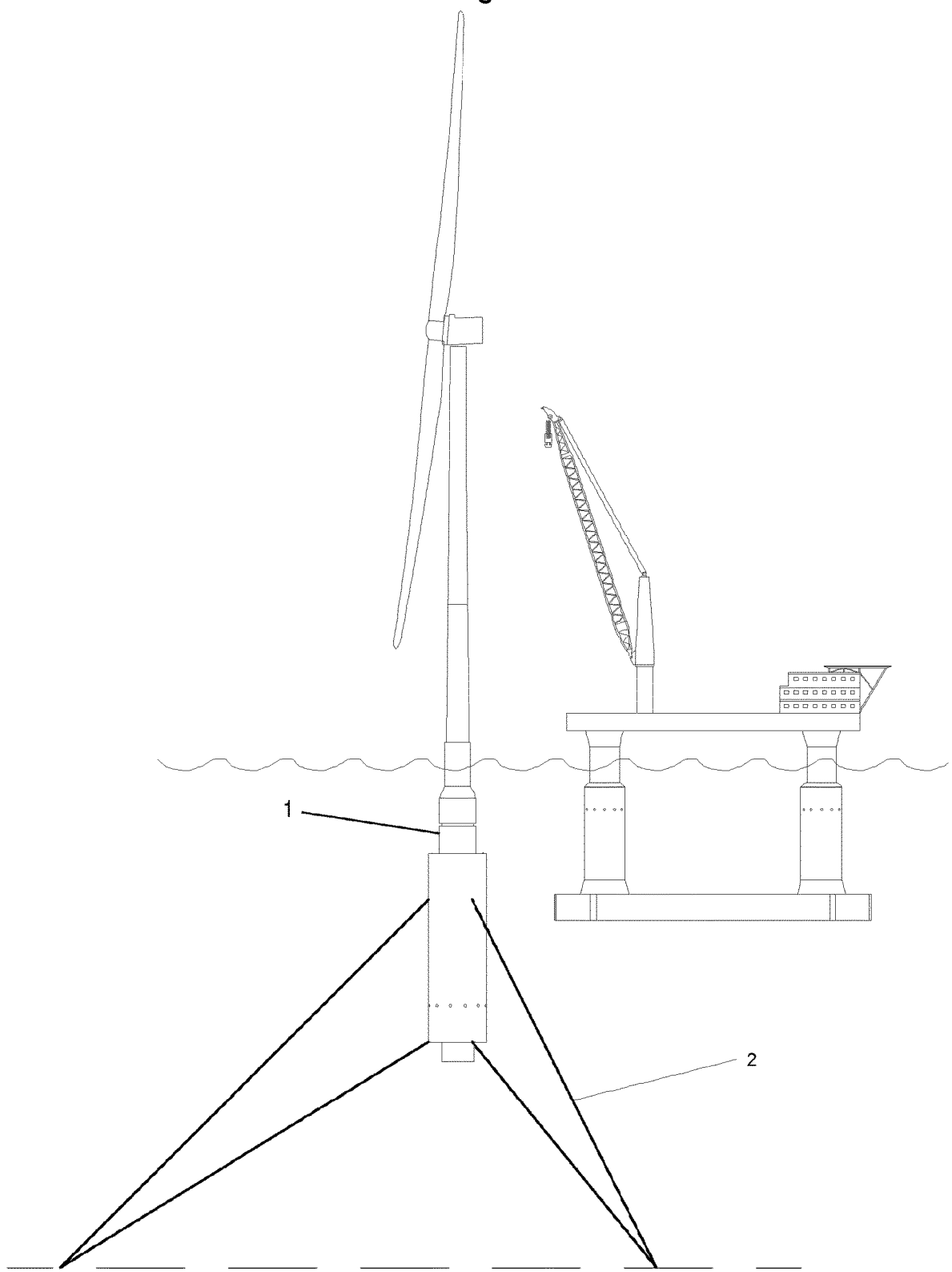
FIG. 8 shows a side view of the platform ballasted up to operating draught with tight anchoring lines.

FIG. 8 shows the semi-submersible platform 1 ballasted up to operating draught and the anchoring lines 2 are tightened and the platform is steadily floating in a body of water.

The person skilled in the art realizes that the present invention is not limited to the preferred embodiments described above. The person skilled in the art further realizes that modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. A single-column semi-submersible platform for fixed anchoring in deep water, the semi-submersible platform comprising:
   a lower solid ballast module;
   a middle seawater ballast module; and
   a top buoyancy module,
   wherein the lower solid ballast module, the middle seawater ballast module, and the top buoyancy module are arranged telescopically in an axial direction and can be controlled relative to each other in the axial direction such that the semi-submersible platform floats vertically and steadily in a body of water, and
   wherein a closed annulus is formed between at least a portion of the middle seawater ballast module and at least a portion of the lower solid ballast module, and a conduit is provided for pumping pressurized seawater into the annulus and for draining the annulus.

2. The semi-submersible platform of claim 1, wherein the lower solid ballast module comprises an upper cylindrical portion that has a diameter that is greater than a lower cylindrical portion.

3. The semi-submersible platform of claim 1, wherein the middle seawater ballast module is a hollow cylinder with inner cylindrical portions of various diameters.

4. The semi-submersible platform of claim 1, wherein the top buoyancy module comprises a lower cylindrical portion and an upper cylindrical portion.

5. The semi-submersible platform of claim 1, wherein the middle seawater ballast module is hollow for accommodating the lower solid ballast module and the top buoyancy module.

6. The semi-submersible platform of claim 1, wherein the lower solid ballast module, the middle seawater ballast module and the top buoyancy module each comprises a through-going axial cavity.

7. The semi-submersible platform of claim 1, wherein the top buoyancy module comprises an integrated heave-neutralizing system with a confined air pressure volume, which balances a level in a rise canister under a lowest water level of a sea for waves and tide for a current location.

8. The semi-submersible platform of claim 7, wherein the integrated heave-neutralizing system allows rigid anchoring without vertical heave movements and thereby allows a secondary rigid anchoring with flat angle at a lower level on the semi-submersible platform, so that the vertical banking angle is reduced, and the semi-submersible platform is exposed to minimum environmental impact.

9. The semi-submersible platform of claim 1, wherein the top buoyancy module comprises a foundation for connection to a tower for wind generators.

10. The semi-submersible platform of claim 1, wherein the semi-submersible platform is anchored to a seabed by means of anchoring lines.

11. The semi-submersible platform of claim 3, wherein the annulus is formed between the lower solid ballast module lower cylindrical portion and an inner wall of the middle seawater ballast module.

12. A method of controlling a semi-submersible platform comprising a lower solid ballast module, a middle seawater ballast module, a top buoyancy module; wherein the lower solid ballast module, the middle seawater ballast module, and the top buoyancy module are arranged telescopically in an axial direction, the semi-submersible platform comprising a closed annulus formed between at least a portion of the lower solid ballast module and at least a portion of the middle seawater ballast module, the method comprising:
   pumping pressurized seawater into the annulus; and
   draining the annulus, whereby an axial position of the lower solid ballast module relative to the middle seawater ballast module is controlled.

13. The method of claim 12, wherein the lower solid ballast module comprises an upper cylindrical portion that has a diameter that is greater than a lower cylindrical portion.

14. The method of claim 12, wherein the middle seawater ballast module is a hollow cylinder with inner cylindrical portions of various diameters, and wherein the middle seawater ballast module is hollow for accommodating the lower solid ballast module and the top buoyancy module.

15. The method of claim 12, wherein the top buoyancy module comprises a lower cylindrical portion and an upper cylindrical portion.

16. The method of claim 12, wherein the lower solid ballast module, the middle seawater ballast module and the top buoyancy module each comprises a through-going axial cavity.

17. The method of claim 12, wherein the top buoyancy module comprises an integrated heave-neutralizing system with a confined air pressure volume, which balances a level in a rise canister under a lowest water level of a sea for waves and tide for a current location, wherein the integrated heave-neutralizing system allows rigid anchoring without vertical heave movements and thereby allows a secondary rigid anchoring with flat angle at a lower level on the semi-submersive platform, so that the vertical banking angle is reduced, and the semi-submersible platform is exposed to minimum environmental impact.

18. The method of claim 12, wherein the top buoyancy module comprises a foundation for connection to a tower for wind generators.

19. The method of claim 12, wherein the semi-submersible platform is anchored to a seabed by means of anchoring lines.

20. The method of claim 14, wherein the annulus is formed between the lower solid ballast module lower cylindrical portion and an inner wall of the middle seawater ballast module.

* * * * *